United States Patent [19]

Center et al.

[11] Patent Number: 4,901,000
[45] Date of Patent: Feb. 13, 1990

[54] VARIABLE RATE STEPPER MOTOR DRIVER CIRCUIT AND METHOD

[75] Inventors: Marc B. Center, Royal Oak; Norman Maasshoff, Warren, both of Mich.

[73] Assignee: General Motors Corporation, Detroit, Mich.

[21] Appl. No.: 313,915

[22] Filed: Feb. 23, 1989

[51] Int. Cl.$^4$ .............................................. H02L 8/00
[52] U.S. Cl. ................................... 318/696; 318/685
[58] Field of Search ................................ 318/696, 685

[56] References Cited

U.S. PATENT DOCUMENTS

| | | | |
|---|---|---|---|
| 4,220,904 | 9/1980 | Leenhaub et al. | 318/696 |
| 4,277,731 | 7/1981 | Ponzracz | 318/685 |
| 4,347,821 | 9/1982 | Saito | 123/440 |
| 4,377,847 | 3/1983 | Daniel et al. | 364/400 |
| 4,414,498 | 11/1983 | Gerrner | 318/696 |
| 4,429,268 | 1/1984 | Yajima et al. | 318/696 |
| 4,439,717 | 3/1984 | Berney | 318/696 |
| 4,443,746 | 4/1984 | Araki | 318/696 |
| 4,480,218 | 10/1984 | Hair | 318/696 |
| 4,489,260 | 12/1984 | Matsushita | 318/696 |
| 4,496,891 | 1/1985 | Kobayashi | 318/696 |
| 4,510,266 | 4/1985 | Eertink | 318/696 |
| 4,661,754 | 4/1987 | Tajima et al. | 318/696 |
| 4,672,283 | 6/1987 | Kobayashi | 318/696 |
| 4,684,865 | 8/1987 | Auger | 318/696 |
| 4,684,866 | 8/1987 | Nehmer et al. | 318/696 |
| 4,692,674 | 9/1987 | Packard et al. | 318/254 |
| 4,706,008 | 11/1987 | Cronch et al. | 318/696 |

Primary Examiner—William M. Shoop, Jr.
Assistant Examiner—Saul M. Bergmann
Attorney, Agent, or Firm—Mark A. Navarre

[57] ABSTRACT

A circuit inserted between a microprocessor controller and a stepper motor driver uses a detector to detect single peak or double peak pulses from the controller and selectively produce one or two motor steps for each controller program loop, and a time delay circuit to regulate the time of the second step to yield a substantially regular stepping rate.

9 Claims, 1 Drawing Sheet

INPUT PULSE
DETECT WINDOW
SECOND PULSE DETECT
SECOND PULSE MEMORY
DELAY TIMER
DETECT WINDOW
RESTART PULSE
OUTPUT TO MOTOR

VARIABLE RATE STEPPER MOTOR DRIVER CIRCUIT AND METHOD

FIELD OF THE INVENTION

This invention relates to a control method and circuit for a stepper motor and particularly to such a method and circuit for changing the motor rate depending on the characteristics of a control input.

BACKGROUND OF THE INVENTION

In automotive vehicle engine controls stepper motors responsive to microprocessor signals are often used to effect mechanical adjustments for engine operation. For example, EGR valves and idle air control valves are positioned by stepper motors by an engine control computer. Generally, such a computer is most effectively programmed to execute its program at a fixed rate, such as 160 Hz, and to issue a motor control pulse in each program loop when any motor operation is desired to yield a 160 Hz stepping rate. Such a fixed motor rate is accompanied by a fixed torque. At times it is advantageous to change either the speed of operation or the torque. This can be accomplished by changing the computer software but this is a major undertaking which may not be justified for the particular advantages to be gained.

SUMMARY OF THE INVENTION

It is therefore an object of the invention to provide a circuit responsive to a computer or other controller operating at a fixed rate for driving a stepper motor at a variable rate. It is a further object of the invention to provide such a circuit responsive to a coded output of the controller to determine the stepper motor rate.

Still another object of the invention is to provide a method of stepper motor control to selectively provide a motor step rate equal to or higher than a control signal rate.

The invention is carried out by a dual rate stepper motor driver circuit responsive to a coded input signal for issuing output pulses at a low rate or a high rate comprising: a motor driver circuit responsive to an input signal for delivering an output signal for stepping a motor at each input signal, and a decoding circuit responsive to the coded input signal for detecting a high rate code and issuing an auxiliary input signal to the driver circuit when a high rate code is detected to step the motor a second time.

The invention is further carried out by the method of controlling the rate of a stepper motor by a coded signal comprising the steps of: producing a coded signal at a fixed repetition rate for initiating stepper motor operation, the rate of operation depending on the signal repetition rate and on the code, stepping the motor once when the coded signal is produced, decoding the signal to determine the number of motor steps for each signal produced, and before another signal is produced, stepping the motor again for each additional step required by the code.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
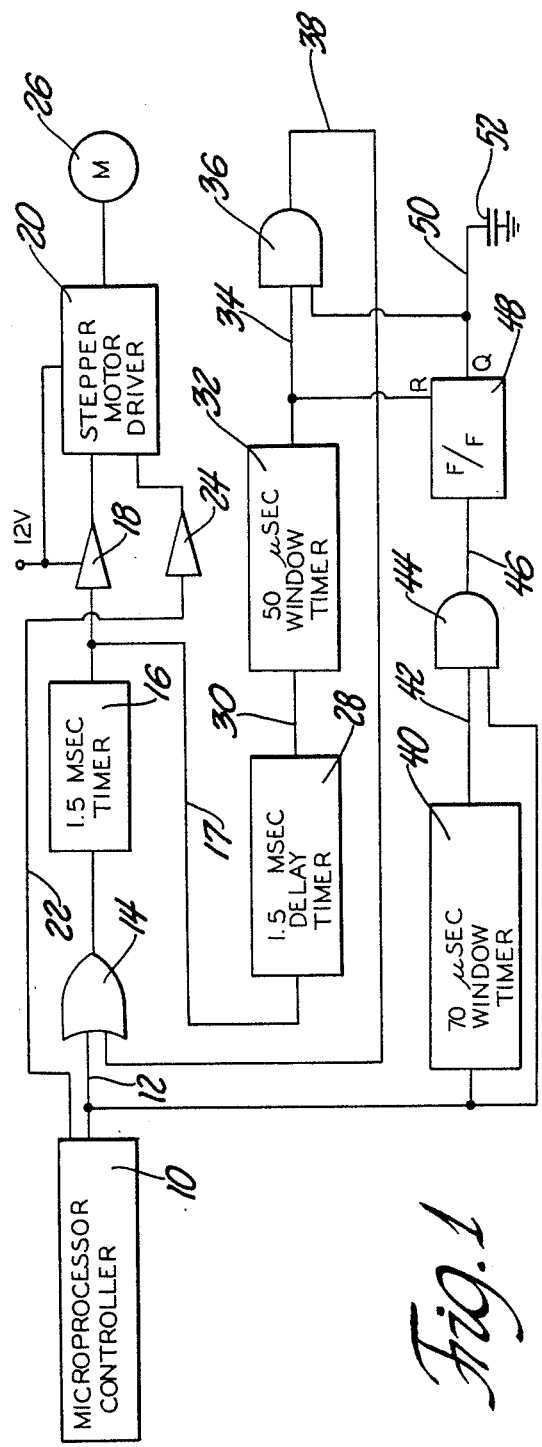
FIG. 1 is a block diagram of a stepper motor control circuit according to the invention.

As described herein and shown in the drawings, the method of the invention is implemented in a timing and logic circuit coupled to a controller such as a microprocessor engine control for stepping a motor once for each controller output pulse when the output comprises single pulses and stepping the motor twice for each output pulse if the output comprises double pulses. In either case, the stepping pulses of the motor are substantially equally spaced for a given type of output pulse. In this manner a controller which outputs control pulses at a 160 Hz rate can selectively achieve stepper motor operation at 160 Hz or 320 Hz.

It ill be apparent that the pulses could be coded in another manner to achieve a similar result without departing from the spirit of the invention. For example a single controller pulse could cause the motor to step twice and a double controller pulse could cause the motor to step once. It will also be apparent that the motor could be stepped more then once or twice for each control pulse. In other word the controller output is coded in some convenient manner for the driver circuit to decode it and respond appropriately.

Referring to the drawings, a microprocessor controller 10 such as an automotive engine control unit has an output on line 12 coupled to the input of an OR gate 14 which is connected to a 1.5 ms timer 16. The timer 16 is coupled through a buffer 18 to an input of a stepper motor driver 20. Another controller output on line 22 is coupled through another buffer 24 to an input of the driver 20. A stepper motor 26 is connected to the driver 20. The motor 26 is energized to advance one step when an input pulse is delivered through the buffer 18. The signal from the buffer 24 determines the direction of motor movement.

A time delay circuit includes a second timer 28. The output of timer 16 on line 17 is connected to the second timer called a 1.5 ms delay timer 28 set to start timing at the falling edge of the timer 16 output to generate an output on line 30 which is connected to a 50 microsecond window timer 32. The timer 32 starts to time at the falling edge of the signal on line 30 to produce a 50 microsecond pulse on line 34 which is connected to the input of an AND gate 36. The AND gate 36 output on line 38 goes to the input of OR gate 14.

A second pulse detect circuit comprises a 70 microsecond window timer 40 with its input coupled to the output 12 of the controller 10 and its output connected on line 42 to an AND gate 44. The timer 40 is set to start timing at the falling edge of the signal on line 12. A second input of the AND gate 44 is connected to the line 12 while the gate output is connected by a line 46 to a D flip/flop 48. The flip/flop 48 has its Q output connected on line 50 to an input of the AND gate 36 and also connected to a grounded capacitor 52 so that the Q output will remain for a time after the flip/flop is reset. The reset terminal R of the flip/flop 48 is connected to the output line 34 of the window timer 32.

Figure 2:
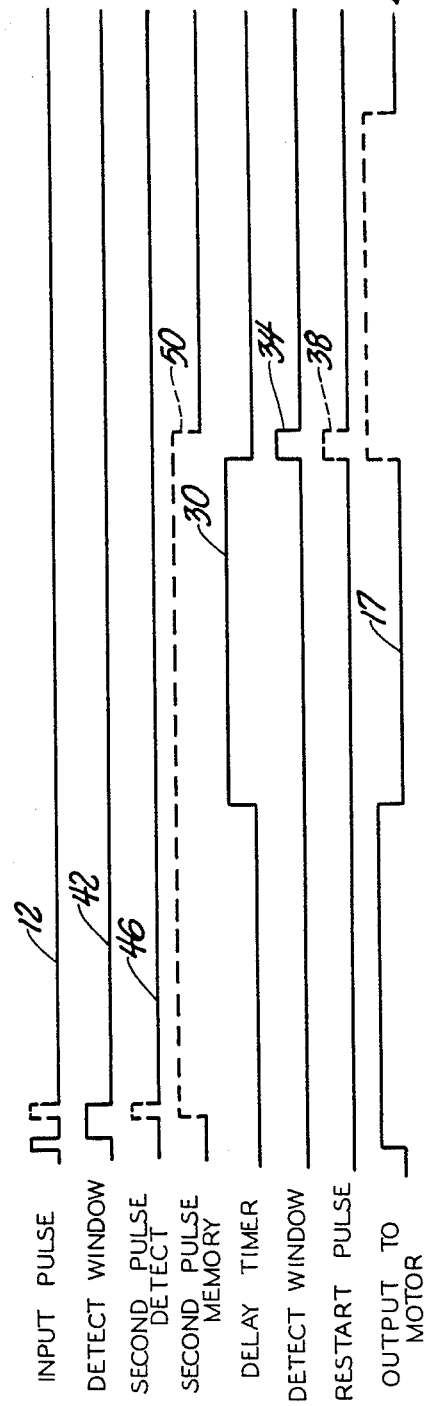
FIG. 2 is a timing diagram illustrating the operation of the circuit of FIG. 1.

The operation of the circuit of FIG. 1 is explained with the aid of the timing chart of FIG. 2 wherein each pulse is identified by the line carrying the pulse. The controller is programmed to issue a single pulse as each program loop is executed if a slow rate of the stepper motor is required. The single pulse is shown as a solid line pulse 12 and all ensuing pulses 30, 34, 42 and part of 17 in the circuit also are shown in solid lines. The program causes the generation of a second peak shown in dashed lines for pulse 12, if a fast rate of the stepper motor is desired. In that case additional pulses 38, 46, 50 and part of 17 occur in the circuit as shown in dashed lines. Preferably each peak in the pulse 12 is 20 microseconds wide and if they both occur they are spaced by 55 microseconds.

When the pulse 12 occurs, it is passed by the OR gate 14 to start the timer 16 which immediately issues a signal 17 to step the motor 26. The timer 16 assures that the energizing pulse to the motor lasts for 1.5 ms to effect proper motor operation. At the falling edge of the signal on line 17 the delay timer 28 starts to produce the pulse 30 and when it terminates, the window timer 32 generates a pulse 34 which occurs 3 ms after the input pulse 12. The falling edge of the first peak of pulse 12 starts the window timer 40 which produces a 70 microsecond detect window on line 42. If no second peak of pulse 12 occurs within that window no further circuit activity takes place for the current program loop. On the other hand, if the second peak of pulse 12 does occur during the window 34, both inputs of AND gate 44 will be high to produce the second pulse detect signal 46. This activates the flip/flop 48 which serves as a memory of the second pulse event. The memory signal 50 is maintained slightly beyond the time of the flip/flop reset by the detect window 34. Then the AND gate 36 is momentarily turned on to generate the restart pulse 38 which is passed by the OR gate 14 to start the timer 16 to cause another motor stepping operation.

In this manner, the circuit responds to the code (one peak or two) in the input pulse 12 to operate the motor at a first rate or a second rate which is twice the first rate. The motor pulses are substantially equally spaced because the sum of the timer 16 and timer 28 times is chosen to be about half the period of the program loop to start the second pulse, if any, about midway between the input pulses 12. Thus when the program operates at 160 Hz the input pulses occur each 6.25 ms. Second motor pulses, if any, will occur 3 ms after the first pulses for regular stepping operation at a 320 Hz rate.

The embodiments of the invention in which an exclusive property or privilege is claimed are defined as follows:

1. A variable rate stepper motor driver circuit responsive to a coded input signal for issuing output pulses at a low rate or a higher rate comprising:
    a motor driver circuit responsive to an input signal for delivering an output signal for stepping a motor at each input signal, and
    a decoding circuit responsive to the coded input signal for detecting a higher rate code and issuing at least one auxiliary input signal to the driver circuit when a higher rate code is detected to step the motor at least a second time.

2. A variable rate stepper motor driver circuit responsive to a coded input signal for issuing output pulses at a low rate or a higher rate comprising:
    a motor driver circuit responsive to an input signal for delivering an output signal for stepping a motor at each input signal,
    a decoding circuit responsive to the coded input signal for detecting a higher rate code, and
    timing means subject to the decoding circuit and effective when a high rate code is detected for issuing at least one auxiliary input signal to the driver circuit at preset times after the coded input signal to step the motor at least a second time.

3. A dual rate stepper motor driver circuit responsive to a coded input signal for issuing output pulses at a low rate or a high rate comprising:
    a motor driver circuit responsive to an input signal for delivering an output signal for stepping a motor at each input signal,
    a decoding circuit responsive to the coded input signal for detecting a high rate code and issuing a high rate signal,
    a timing circuit for issuing a time signal at a delayed time after the coded input signal, and
    means for supplying an auxiliary input signal to the motor driver circuit when both the high rate signal and the time signal are present.

4. A stepper motor control for operating a stepper motor at a first rate or a second rate which is double the first rate, comprising:
    means for issuing single pulses at a first rate when stepper motor operation at the first rate is desired and for issuing double pulses at the same rate when stepper motor operation at the second rate is desired,
    motor driving means having an input coupled to the control means for immediately stepping the motor once when either a single pulse or a double pulse is received, and
    means responsive to a double pulse and coupled to the input of the motor driving means for generating a single pulse after the motor has completed one step to step the motor a second time.

5. A stepper motor control for operating a stepper motor at a first rate or a second rate which is double the first rate, comprising:
    control means for issuing single pulses at a first rate when stepper motor operation at the first rate is desired and for issuing double pulses at the same rate when stepper motor operation at the second rate is desired,
    motor driving means having an input coupled to the control means for immediately stepping the motor once when either a single pulse or a double pulse is received,
    a detector circuit for detecting the occurrence of a double pulse, and
    a timer circuit connected to the detector circuit and coupled to the input of the motor driving means for generating a single pulse to step the motor a fixed time after a double pulse is issued.

6. The invention as defined in claim 5 wherein the timer circuit is set to generate said single pulse approximately midway between the pulses issued by the control means to effectively maintain a regular stepper motor rate when the second rate is in effect.

7. The method of controlling the rate of a stepper motor by a coded signal comprising the steps of:
    producing a coded signal at a fixed repetition rate for initiating stepper motor operation, the rate of operation depending on the signal repetition rate and on the code,
    stepping the motor once when the coded signal is produced,
    decoding the signal to determine the number of motor steps for each signal produced, and before another signal is produced, stepping the motor again for each additional step required by the code.

8. The invention as defined in claim 7 including timing each additional step of the motor to yield a substantially regular stepping rate.

9. The method of controlling the rate of a stepper motor by a coded signal comprising the steps of:
producing a periodic coded signal at a fixed repetition rate for initiating stepper motor operation, the signal comprising a single pulse for a single motor step in each period and a double pulse for two motor steps in each period,
stepping the motor once when the coded signal is produced,
detecting the presence of a double pulse, and
delaying for substantially half a period and then stepping the motor again if a double pulse is detected.

* * * * *